United States Patent
Chae et al.

(10) Patent No.: US 10,162,222 B2
(45) Date of Patent: Dec. 25, 2018

(54) CURVED LIQUID CRYSTAL DISPLAY DEVICE

(71) Applicant: LG DISPLAY CO., LTD., Seoul (KR)

(72) Inventors: Hee-Young Chae, Paju-si (KR); Se-Hong Park, Paju-si (KR); In-Yeong Kong, Paju-si (KR); Jong-Sin Park, Goyang-si (KR); Ja-Young Pyun, Seoul (KR); Dong-Yoon Lee, Seoul (KR); Jae-Woong Youn, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/723,128

(22) Filed: May 27, 2015

(65) Prior Publication Data

US 2015/0370116 A1 Dec. 24, 2015

(30) Foreign Application Priority Data

Jun. 24, 2014 (KR) .................. 10-2014-0077044

(51) Int. Cl.
| | | |
|---|---|---|
| *G02F 1/1339* | (2006.01) | |
| *G02F 1/1335* | (2006.01) | |
| *G02F 1/1343* | (2006.01) | |
| G02F 1/1362 | (2006.01) | |

(52) U.S. Cl.
CPC .... *G02F 1/13394* (2013.01); *G02F 1/133512* (2013.01); *G02F 1/134363* (2013.01); *G02F 2001/13396* (2013.01); *G02F 2001/136222* (2013.01)

(58) Field of Classification Search
CPC .......... G02F 1/13394; G02F 1/133512; G02F 2001/13396; G02F 2001/136222; G02F 2001/13398

USPC ....................... 349/106, 153, 155
See application file for complete search history.

(56) References Cited

U.S. PATENT DOCUMENTS

| | | | |
|---|---|---|---|
| 6,778,232 B2* | 8/2004 | Nakata .............. | G02F 1/136227 257/59 |
| 2007/0121051 A1* | 5/2007 | Yokoyama .......... | G02F 1/13394 349/156 |
| 2008/0151133 A1* | 6/2008 | Kim .................... | G02F 1/13338 349/12 |

(Continued)

FOREIGN PATENT DOCUMENTS

| | | |
|---|---|---|
| CN | 101097336 A | 1/2008 |
| CN | 101344685 A | 1/2009 |
| CN | 103713426 A | 4/2014 |

*Primary Examiner* — Nathanael R Briggs
(74) *Attorney, Agent, or Firm* — Dentons US LLP (57) ABSTRACT

A curved LCD device includes first and second substrates; gate and data lines in a display area on the first substrate and defining a pixel region; a thin film transistor connected to the gate and data lines; a color filter layer in the pixel region; pixel and common electrodes on the color filter layer; first light-blocking layers in the display area over the first substrate; a second light-blocking layer in a non-display area over the first substrate; first and second column spacers in the display area on the second substrate, wherein the first column spacer has a first height, and the second column spacer has a second height; and a third column spacer in the non-display area on the second substrate and having the second height, wherein the third column spacer is in point-contact with the second light-blocking layer when an external force is applied.

15 Claims, 8 Drawing Sheets

(56) References Cited

U.S. PATENT DOCUMENTS

| | | | |
|---|---|---|---|
| 2009/0066903 A1* | 3/2009 | Yoshida | G02F 1/1339 349/153 |
| 2010/0103354 A1 | 4/2010 | Yu et al. | |
| 2010/0134731 A1 | 6/2010 | Jeon et al. | |
| 2010/0188624 A1* | 7/2010 | Lee | G02B 5/201 349/106 |
| 2011/0304805 A1* | 12/2011 | Tseng | G02F 1/133512 349/106 |
| 2013/0027647 A1* | 1/2013 | Nagashima | G02F 1/13394 349/123 |
| 2014/0092350 A1* | 4/2014 | Byeon | G02F 1/1339 349/106 |

* cited by examiner

FIG. 1

Related Art

CURVED LIQUID CRYSTAL DISPLAY DEVICE

CROSS-REFERENCE TO RELATED APPLICATIONS

The present application claims the benefit of Korean Patent Application No. 10-2014-0077044 filed in Korea on Jun. 24, 2014, which is incorporated by reference in its entirety for all purposes as if fully set forth herein.

BACKGROUND

Field of the Disclosure

The present disclosure relates to a liquid crystal display (LCD) device, and more particularly, to a curved LCD device.

Discussion of the Related Art

With rapid development of information technologies, various types of display devices for displaying images have been required. Recently, flat panel display (FPD) devices such as liquid crystal display (LCD) devices, plasma display panel (PDP) devices, and organic light emitting diode display (OLED) devices have been widely developed and applied to various fields.

Among the various types of FPD devices, LCD devices have been widely used because the LCD devices have advantages in lower weight, smaller size, and reduced power consumption compared to other display technologies.

Generally, an LCD device includes two substrates, a liquid crystal layer between the two substrates, and pixel and common electrodes for driving liquid crystal molecules of the liquid crystal layer as part of a liquid crystal display panel. The LCD device further includes a backlight unit to illuminate the liquid crystal display panel. When voltages are applied to the pixel and common electrodes, an electric field is induced between the electrodes, and the liquid crystal molecules are arranged by the electric field. The arrangement of the liquid crystal molecules varies depending on the electric field, and transmittance of light from the backlight passing through the liquid crystal layer is modulated by the position of the molecules. Grayscale images can be displayed by controlling the light transmittance of the liquid crystal material.

The LCD device has been widely used in portable equipment such as cellular phones and multimedia devices, monitors for notebook computers and desktop computers, and large-sized televisions.

However, the LCD device has a problem in that a distance from a viewing point of a viewer to a screen of the LCD device varies depending on locations.

This will be described with reference to FIG. 1.

Figure 1:
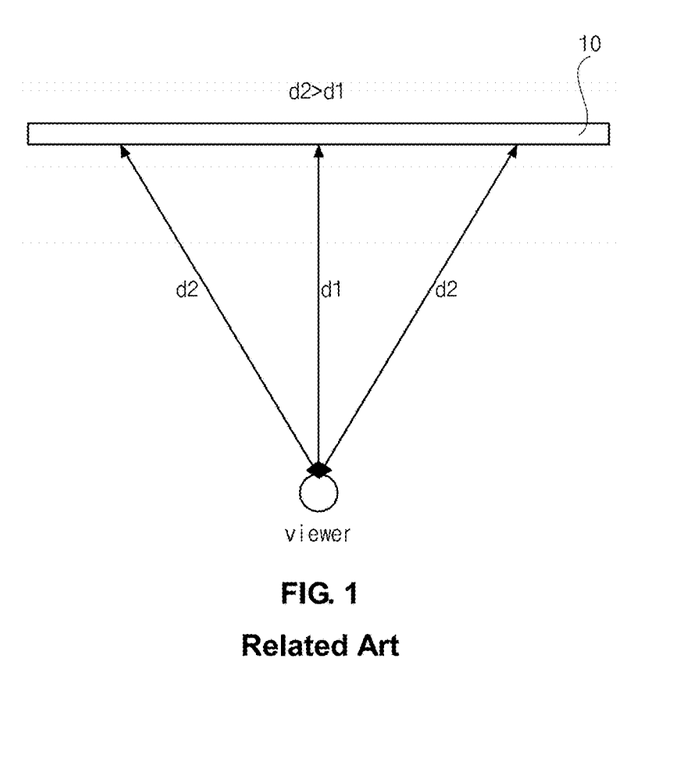
FIG. 1 is a view of schematically illustrating an LCD device according to the related art.

FIG. 1 is a view schematically illustrating an LCD device according to the related art.

In FIG. 1, since the LCD device 10 is flat, there is a difference between a first distance d1 from a main viewing point of a viewer to a center of the LCD device 10 and a second distance d2 from the main viewing point to a left or right side of the LCD device 10. Namely, the second distance d2 is greater than the first distance d1, and there is a distance deviation in this flat display device.

The distance deviation grows worse as the size of the LCD device 10 increases, and the increased distance deviation decreases a viewer's perceived sense of immersion in an image displayed by the LCD device 10.

SUMMARY

Accordingly, the present invention is directed to a curved LCD device that substantially obviates one or more of the problems due to limitations and disadvantages of the related art.

An object of the present invention is to provide a curved LCD device being capable of solving a distance deviation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described herein, the present invention provides a curved liquid crystal display device including a first substrate and a second substrate where a display area and a non-display area are defined; a liquid crystal layer between the first and the second substrates; a gate line and a data line in the display area on an inner surface of the first substrate and crossing each other to define a pixel region; a thin film transistor connected to the gate line and the data line; a color filter layer in the pixel region of the first substrate and including red, green and blue color filters; a pixel electrode on the color filter layer and connected to the thin film transistor; a common electrode on the color filter layer, spaced apart from and alternating with the pixel electrode; a plurality of first light-blocking layers in the display area over the inner surface of the first substrate, each first light-blocking layer disposed between adjacent pixel regions; a second light-blocking layer in the non-display area over the inner surface of the first substrate; a first column spacer and a second column spacer in the display area on an inner surface of the second substrate, wherein the first column spacer corresponds to one of the first light-blocking layers and has a first height, and the second column spacer corresponds to another of the first light-blocking layers and has a second height; and a third column spacer in the non-display area on the inner surface of the second substrate and having the second height, wherein the third column spacer is in point-contact with the second light-blocking layer when an external force is applied.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 2:
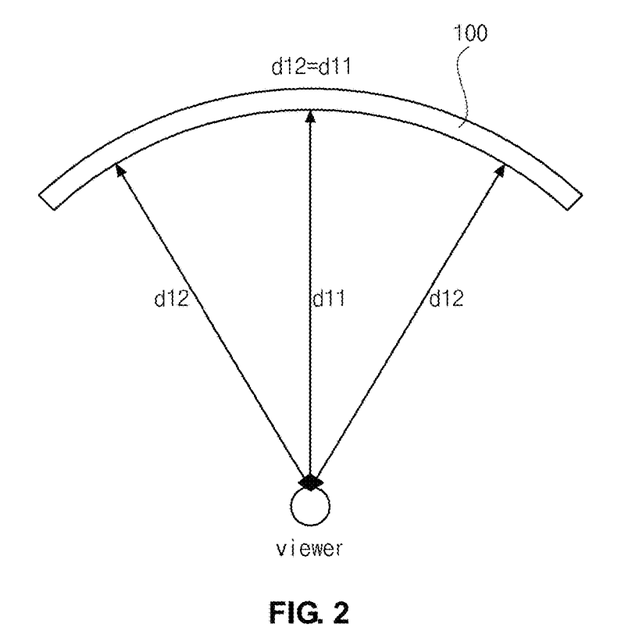
FIG. 2 is a schematic view of a curved LCD device according to a first exemplary embodiment of the present invention.

FIG. 2 is a schematic view of a curved LCD device according to a first embodiment of the present invention.

As shown in FIG. 2, a curved LCD device 100 has a curved shape. Namely, a typically flat display device is curved by a predetermined curvature with respect to a center of the display device to have a curved shape.

Accordingly, a first distance d11 from a main viewing point of a viewer to a center of the curved LCD device 100 is substantially equal to a second distance d12 from the main viewing point to a left or right side of the curved LCD device 100, and there is no distance deviation. As a result, the viewer's experience of feeling immersed in the image content is improved.

Figure 3:
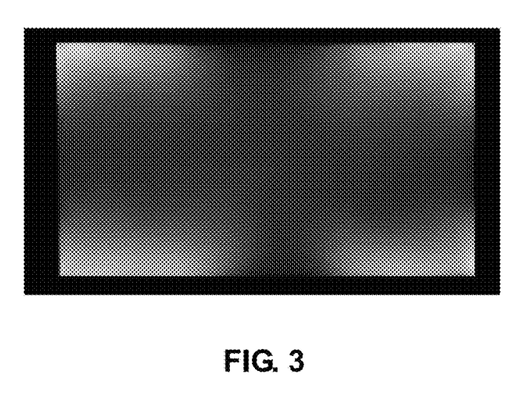
FIG. 3 is a view showing light leakage in four corners of the LCD device according to the first embodiment of the present invention.

On the down side, because the curved LCD device 100 according to the first embodiment has a curvature that is artificially formed, as shown in FIG. 3, there is light leakage in four corners of the curved LCD device 100. FIG. 3 illustrates an increase of light transmission in the four corners of the display device when displaying an all-black image.

The light leakage will be described with reference to FIG. 4 and FIGS. 5A to 5C.

Figure 4:
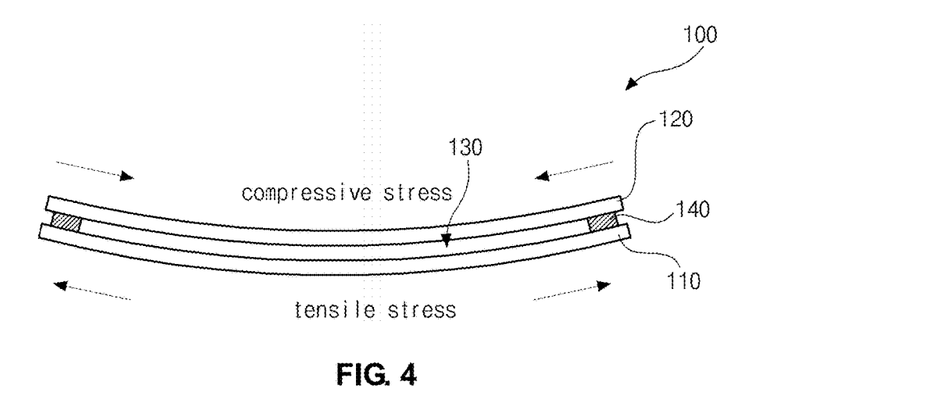
FIG. 4 is a schematic cross-sectional view of a curved LCD device according to the first embodiment of the present invention.
Figure 5A:
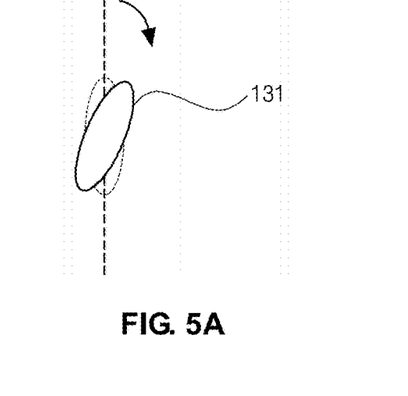
FIG. 5A is a view showing an arrangement of a liquid crystal molecule on a first substrate in a corner region of the curved LCD device according to the first embodiment of the present invention.
Figure 5B:
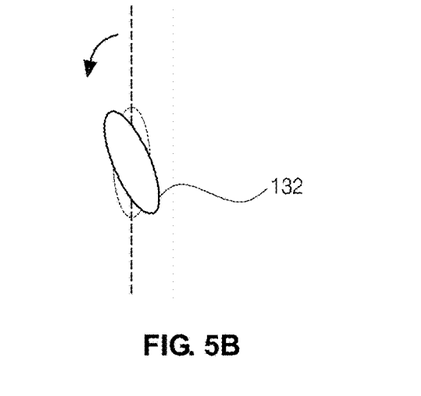
FIG. 5B is a view showing an arrangement of a liquid crystal molecule on a second substrate in the corner region of the curved LCD device according to the first embodiment of the present invention.
Figure 5C:
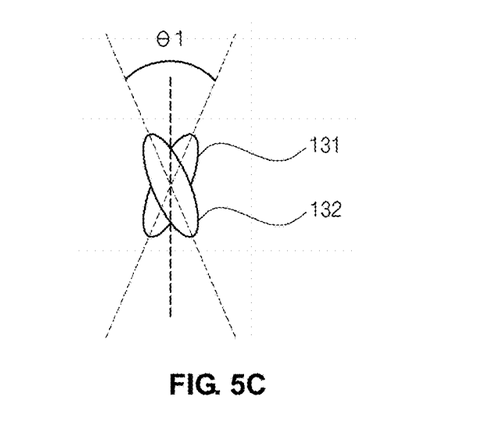
FIG. 5C is a view showing together the arrangements of the liquid crystal molecules of FIG. 5A and FIG. 5B.

FIG. 4 is a schematic cross-sectional view of a curved LCD device according to the first embodiment of the present invention. FIG. 5A is a view showing an arrangement of a liquid crystal molecule on a first substrate in a corner region of the curved LCD device according to the first embodiment of the present invention, FIG. 5B is a view showing an arrangement of a liquid crystal molecule on a second substrate in the corner region of the curved LCD device according to the first embodiment of the present invention, and FIG. 5C is a view showing together the arrangements of the liquid crystal molecules of FIG. 5A and FIG. 5B.

In FIG. 4, the curved LCD device 100 according to the first embodiment of the present invention includes a first substrate 110, a second substrate 120, and a liquid crystal layer 130 between the first and second substrates 110 and 120. A seal pattern 140 is formed in edge areas between the first and second substrates 110 and 120 to prevent the liquid crystal layer 130 from leaking out. A display area for displaying an image and a non-display area surrounding the display area are defined on the first and second substrates 110 and 120.

Although not shown in the figure, a gate line, a data line, a thin film transistor, and a pixel electrode are formed in the display area on an inner surface of the first substrate 110. The gate line and the data line cross each other to define a pixel region. The thin film transistor is connected to the gate line and the data line. The pixel electrode is in the pixel region and is connected to the thin film transistor. In addition, a common electrode may be further formed in the display area on the inner surface of the first substrate 110. The common electrode and the pixel electrode generate an electric field when a voltage is applied.

A color filter layer may also be formed in the display area on the inner surface of the first substrate 110. The color filter layer includes red, green, and blue color filters sequentially arranged, and each color filter corresponds to one pixel region.

The structure may be referred to as a color filter on array structure, i.e., a COT (color on transistor) structure. The LCD device having the COT structure has an advantage of relatively high aperture ratio because the attachment margin, which is a margin of error when two substrates of the LCD device are attached together, can be decreased and a width of a black matrix, which is disposed between adjacent pixel regions and is determined by considering the attachment margin, can be decreased.

Although not shown in the figure, spacers may be formed in the display area on an inner surface of the second substrate 120 such that the spacers are between the first and second substrates 110 and 120 when the first and second substrates 110 and 120 are attached to maintain a uniform distance between the two substrates. Here, the spacers include a gap column spacer and a push column spacer. The gap column spacer has a higher height than the push column spacer. The gap column spacer contacts a top layer on the inner surface of the first substrate 110, and the push column spacer is spaced apart from the top layer on the inner surface of the first substrate 110.

Moreover, an outer column spacer (not shown) may be further formed in the non-display area on the inner surface of the second substrate 120. The outer column spacer may have the same height as the push column spacer and may include a material that absorbs light to minimize light leakage in the non-display area of the curved LCD device.

In the curved LCD device 100, a black matrix on the first substrate 110 or the second substrate 120 may be omitted, and the aperture ratio may be further increased.

Further, first and second alignment layers (not shown) as top layers may be formed on the inner surfaces of the first and second substrates 110 and 120, respectively. The first and second alignment layers have predetermined alignment axes and determine an initial arrangement of liquid crystal molecules of the liquid crystal layer 130. As is common in the art, liquid crystal molecules adjacent to the alignment layers are naturally oriented parallel to grooves formed in the alignment layers. The second alignment layer on the inner surface of the second substrate 120 may be on the gap column spacer and the push column spacer. In this case, the second alignment layer on the gap column spacer may contact the first alignment layer on the inner surface of the first substrate 110.

Alternatively, the second alignment layer on the inner surface of the second substrate 120 may be under the gap column spacer and the push column spacer. In this case, the gap column spacer may contact the first alignment layer on the inner surface of the first substrate 110.

Additionally, first and second polarizers (not shown) are at outer surfaces of the first and second substrates 110 and 120, respectively. A light-transmission axis of the first polarizer is perpendicular to a light-transmission axis of the second polarizer.

The curved LCD device 100 according to the first embodiment may be changed into a curved state from a flat state.

For example, to attain a curved surface along a transverse direction of the display device, that is, a longer side direction, a flat LCD device is curved toward the second substrate 120 along the transverse direction with respect to the center of the device, and the curved LCD device 100 with a predetermined curvature is obtained. Because the edge areas of the first and second substrates 110 and 120 are attached by the seal pattern 140, the first and second substrates 110 and 120 move differently when being curved.

Namely, in the curved LCD device 100, tensile stress is applied to the first substrate 110, which is curved outside, along the transverse direction, and compressive stress is applied to the second substrate 120, which is curved inside, along the transverse direction. As the edge areas of the first and second substrates 110 and 120 are fixed by the seal pattern 140, torsional stress is generated in the edge areas of the first and second substrates 110 and 120, and the first and second substrates 110 and 120 shift in opposite directions.

As configured, the torsional stress is highest in four corners of the first and second substrates 110 and 120. The alignment axes of the first and second alignment layers (not shown) are twisted due to the torsional stress, and the arrangement of the liquid crystal molecules adjacent to the inner surfaces of the first and second substrates 110 and 120 is twisted. This twisting of the liquid crystal molecules moves them from their intended orientation and causes light leakage in the four corners of the LCD device. That is, light from the backlight unit that is intended to be blocked by the orientation of the liquid crystal molecules gets transmitted. This unwanted transmitted light causes a reduced contrast ratio in those areas and a non-uniform appearance.

That is, because the alignment axes of the first and second alignment layers in the corner region of the curved LCD device 100 are twisted in opposite directions, the liquid crystal molecule 131 on the inner surface of the first substrate 110 of FIG. 4 rotates clockwise with respect to the initial alignment axis, as shown in FIG. 5A. As shown in FIG. 5B, in the corner region of the curved LCD device 100, the liquid crystal molecule 132 on the inner surface of the second substrate 120 of FIG. 4 rotates counterclockwise with respect to the initial alignment axis.

Accordingly, as shown in FIG. 5C, the liquid crystal molecule 131 on the inner surface of the first substrate 110 of FIG. 4 and the liquid crystal molecule 132 on the inner surface of the second substrate 120 of FIG. 4 are twisted and arranged to have a first angle θ1 with respect to each other.

This twisted arrangement of the liquid crystal molecules 131 and 132 causes light leakage. Light that is intended to be blocked is transmitted.

Here, the liquid crystal molecules 131 and 132 are twisted to have a larger twist angle as the stress increases. In the curved LCD device 100, when the curvature is formed, the stress applied to the first and second substrates 110 and 120 of FIG. 4 increases due to a surface contact between the outer column spacer and the top layer of the first substrate 110 of FIG. 4 in the non-display area. Thus, stress applied to the liquid crystal molecules 131 and 132 also increases.

In the display area of the curved LCD device 100, self alignment of the liquid crystal molecules becomes weak because a predetermined quantity of the liquid crystal with a predetermined margin considering error is filled between the first and second substrates 110 and 120 of FIG. 4 and the predetermined quantity of the liquid crystal is less than the ideal quantity of the liquid crystal that is exactly required between the first and second substrates 110 and 120 of FIG. 4. As a result, some of the liquid crystal molecules are misoriented, and light leakage occurs. The light leakage may be shifted to a different portion of the LCD device when a surface of the device is touched because the liquid crystal molecules are not uniformly arranged around the different portion of the LCD device due to the touch, and touch visibility, which is a degree of how much it is seen or noticed when it is touched, may be lowered due to the light leakage.

Figure 6:
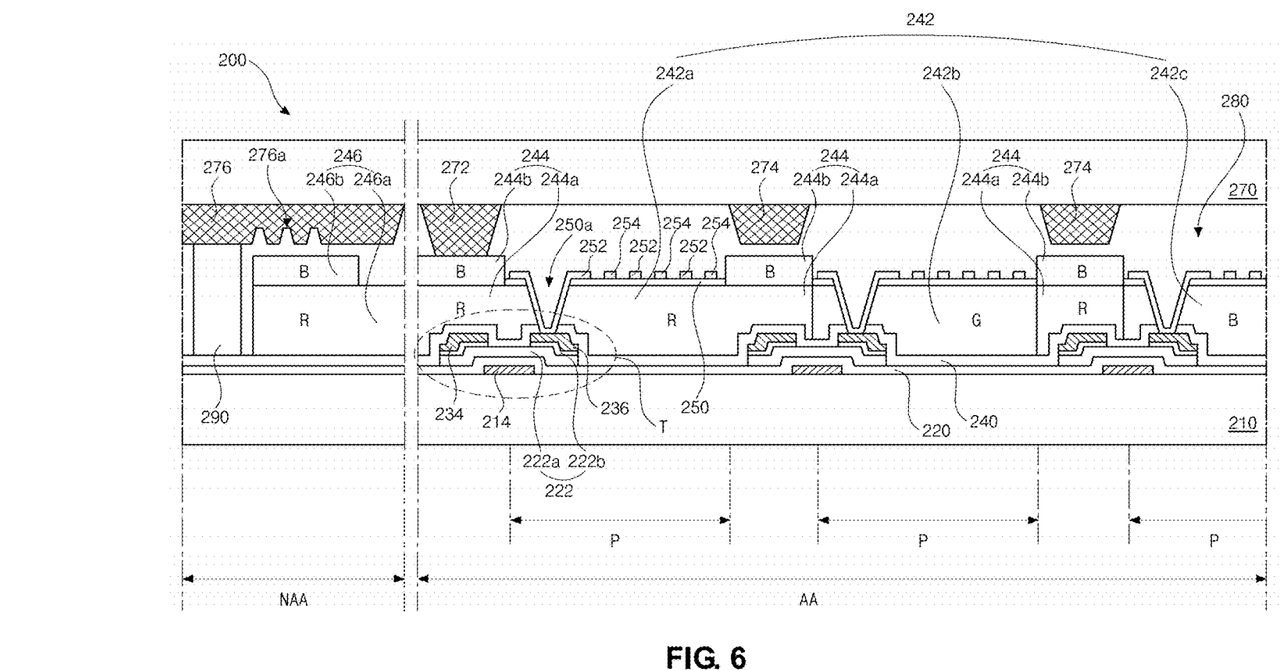
FIG. 6 is a cross-sectional view illustrating a curved LCD device according to a second exemplary embodiment of the present invention.

FIG. 6 is a cross-sectional view illustrating a curved LCD device according to a second embodiment of the present invention.

In FIG. 6, the curved LCD device 200 according to the second embodiment of the present invention includes a first substrate 210, a second substrate 270 and a liquid crystal layer 280 between the first and second substrates 210 and 270.

A display area, AA which may be referred to as an active area, and a non-display area NAA, which may be referred to as a non-active area, are defined on the first and second substrates 210 and 270. An image is displayed in the display area AA, and the non-display area NAA is outside the display area AA. The display area AA may be surrounded by the non-display area NAA. In addition, a plurality of pixel regions P is defined in the display area AA.

A gate line (not shown), a gate electrode 214 and a common line (not shown) are formed in the display area AA on an inner surface of the first substrate 210, The gate line is formed in a first direction, and the gate electrode 214 is connected to the gate line. The gate electrode 214 may be extended from the gate line or may be part of the gate line.

The common line is formed in the first direction and is parallel to the gate line.

A gate insulating layer 220 is formed on the gate line, the gate electrode 214 and the common line.

A semiconductor layer 222 is formed on the gate insulating layer 220 over the gate electrode 214. The semiconductor layer 222 includes an active layer 222a of intrinsic amorphous silicon and ohmic contact layers 222b of impurity-doped amorphous silicon.

Source and drain electrodes 234 and 236 are formed on the semiconductor layer 222. The source and drain electrodes 234 and 236 are spaced apart from each other over the semiconductor layer 222, and the ohmic contact layers 222b have the same shape as the source and drain electrodes 234 and 236. The active layer 222a is exposed between the source and drain electrodes 234 and 236.

The gate electrode 214, the semiconductor layer 222, the source electrode 234 and the drain electrode 236 constitute a thin film transistor T, and the active layer 222a exposed between the source and drain electrodes 234 and 236 becomes a channel of the thin film transistor T.

Also, a data line (not shown) is formed of the same material and on the same layer as the source and drain electrodes 234 and 236. The data line is formed in a second direction perpendicular to the first direction and crosses the gate line to define a pixel region P. The data line is connected to the source electrode 234. A dummy semiconductor pattern (not shown) having the same structure as the semiconductor layer 222 may be formed under the data line.

A passivation layer 240 is formed on the source and drain electrodes 234 and 236 and the data line. The passivation layer 240 may be formed of an inorganic insulating material such as silicon oxide ($SiO_2$) or silicon nitride ($SiN_x$).

A color filter layer 242 is formed on the passivation layer 240. The color filter layer 242 includes red, green, and blue color filters 242a, 242b, and 242c, respectively. Each color filter 242a, 242b, and 242c corresponds to one pixel region P.

A first light-blocking layer 244 is formed between adjacent pixel regions P. The first light-blocking layer 244 includes a first color pattern 244a and a second color pattern 244b on the first color pattern 244a. The first color pattern 244a and the second color pattern 244b may be formed of the same materials as two color filters selected from the red, green, and blue color filters 242a, 242b, and 242c. For example, it is beneficial that the first color pattern 244a and the second color pattern 244b may be formed of the same materials as the red color filter 242a and the blue color filter 242c to increase the light-blocking effect. Here, the first color pattern 244a may be formed of the same material as the red color filter 242a, and the second color pattern 244b may be formed of the same material as the blue color filter 242c. The first light-blocking layer may be over the thin film transistor T.

In a portion of the pixel region P where the red color filter 242a is formed, a part of the red color filter 242a may be the first color pattern 244a. In a portion of the pixel region P where the green color filter 242b or the blue color filter 242c is formed, the first color pattern 244 is formed of the same material as the red color filter 242a corresponding to the thin film transistor T.

An overcoat layer 250 is formed on the color filter layer 242. The overcoat layer 250 has a drain contact hole 250a exposing the drain electrode 236 with the color filter layer 242 and the passivation layer 240.

Although the overcoat layer 250 is formed between adjacent first light-blocking layers 244, more particularly, between adjacent second color patterns 244b in the figure, the overcoat layer 250 may be formed on the first light-blocking layer 244, i.e., on the second color pattern 244b.

A pixel electrode 252 and a common electrode 254 are formed in each pixel region P on the overcoat layer 250. The pixel electrode 252 contacts the drain electrode 236 through the drain contact hole 250a, and the common electrode 254 contacts the common line. Patterns of the common electrode 254 are spaced apart from and alternate with patterns of the pixel electrode 252. The pixel electrode 252 and the common electrode 254 may be formed of a transparent conductive material such as indium tin oxide or indium zinc oxide.

In addition, a second light-blocking layer 246 is formed in the non-display area NAA over the inner surface of the first substrate 210. Here, the non-display area NAA surrounds the display area AA. The second light-blocking layer 246 may surrounds the display area AA in the non-display area NAA.

The second light-blocking layer 246 includes a third color pattern 246a and a fourth color pattern 246b on the third color pattern 246a. The third color pattern 246a may be formed of the same material as the red color filter 242a, and the fourth color pattern 246b may be formed of the same material as the blue color filter 242c. The fourth color pattern 246b may have a smaller size than the third color pattern 246a due to steps of the layers thereunder, and the fourth color pattern 246b may partially expose the third color pattern 246a.

The gate insulating layer 220 and the passivation layer 240 may be formed under the second light-blocking layer 246.

Meanwhile, a first column spacer 272 and a second column spacer 274 are formed in the display area AA on an inner surface of the second substrate 270. Each of the first column spacer 272 and the second column spacer 274 corresponds to one of the first light-blocking layers 244 between adjacent pixel regions P.

Here, the first column spacer 272 corresponds to a gap column spacer maintaining a cell gap, i.e., a distance between substrates. The second column spacer 274 corresponds to a push column spacer preventing deformation when pressure is applied to the substrates. The first column spacer 272 has a higher height than the second column spacer 274. Accordingly, a top surface of the first column spacer 272 contacts the first light-blocking layer 244, and a top surface of the second column spacer 274 is spaced apart from the first light-blocking layer 244.

The first column spacer 272 and the second column spacer 274, which correspond to respective first light-blocking layers 244, may be over respective thin film transistors T. Here, each thin film transistor T corresponds to one of the first column spacer 272 and the second column spacer 274.

In addition, a third column spacer 276 is formed in the non-display area NAA on the inner surface of the second substrate 270. The third column spacer 276 is formed of black resin for absorbing light, and light is absorbed by the third column spacer 276 in the non-display area NAA to thereby prevent light leakage in the non-display area NAA. The third column spacer 276 may be referred to as an outer column spacer.

The third column spacer 276 includes a plurality of depressed portions 276a at its top surface. The depressed portions 276a correspond to the fourth color pattern 246b of the second light-blocking layer 246. That is, the third column spacer 276 has a flat surface without depressed portions corresponding to the third color pattern 246a exposed outside the fourth color pattern 246b, and the depressed portions are not formed in a region where the second light-blocking layer 246 has a single-layered structure to increase the light-blocking effect. The third column spacer 276 has substantially the same height or thickness as the second column spacer 274.

The depressed portions 276a may have a shape such as a polygon including a rectangle or a circle in a plan view. A depth of the depressed portions 276a is smaller than the height of the third column spacer 276.

Here, the maximum width of the depressed portions 276a and a distance between adjacent depressed portions 276a may be less than 25 micrometers. For example, the maximum width of the depressed portions 276a and the distance between adjacent depressed portions 276a may be less than 10 micrometers.

The first, second, and third column spacers 272, 274, and 276 may be formed through one mask process. Namely, a mask may include a light-blocking portion, a light-transmitting portion, and a half light-transmitting portion. When a photosensitive layer for patterning the first, second, and third column spacers 272, 274, and 276 is a positive type where a portion exposed to light is removed after developing, the light-blocking portion corresponds to the first column spacer 272, the half light-transmitting portion corresponds to the second column spacer 274 and the third column spacer 276, and the light-transmitting portion corresponds to the depressed portions 276a and other regions excluding the first, second, and third column spacers 272, 274, and 276. When formed, the distance between adjacent depressed portions 276a may be less than 25 micrometers, and thus, the depressed portions 276a of the third column spacer 276 may have a depth shallower than the height of the third column spacer 276.

On the other hand, when the photosensitive layer is a negative type where a portion exposed to light remains after developing, the light-transmitting portion corresponds to the first column spacer 272, the half light-transmitting portion corresponds to the second column spacer 274 and the third column spacer 276, and the light-blocking portion corresponds to the depressed portions 276a and other regions excluding the first, second, and third column spacers 272, 274, and 276.

A seal pattern 290 is formed in the non-display area NAA on one of the inner surfaces of the first substrate 210 and the second substrate 270, and the first and second substrates 210 and 270 are attached through the seal pattern 290 to prevent the liquid crystal layer 280 from leaking. For example, the seal pattern 290 may be between the passivation layer 240 and the third column spacer 276.

The curved LCD device 200 according to the second embodiment of the present invention has a color filter on array structure or a COT structure where the color filters 242a, 242b, and 242c are formed on the thin film transistor T, and the black matrix is omitted, thereby increasing the aperture ratio.

The first light-blocking layer 244 is formed in the display area AA of the first substrate 210, and the first light-blocking layer 244 separates the pixel regions P in the display area AA, thereby absorbing light between adjacent pixel regions P and blocking light leakage from adjacent pixel regions P.

In addition, the second light-blocking layer 246 is formed in the non-display area NAA of the first substrate 210, and the third column spacer 276 are formed in the non-display area NAA of the second substrate 270, thereby light leakage is prevented in the non-display area NAA.

Namely, the third column spacer 276 formed of black resin may have a relatively low optical density (OD) value as compared with a typical black matrix, and light may is more likely to be transmitted. However, because the second light-blocking layer 246 including the third color pattern 246a and the fourth color pattern 246b is formed on the first substrate 210 corresponding to the third column spacer 276, light absorption is increased in the non-display area NAA, and the light leakage is prevented.

The third column spacer 276 includes the depressed portions 276a corresponding to the fourth color pattern 246b of the second light-blocking layer 246. When the curvature is formed in the curved LCD device according to the second embodiment of the present invention, a force may be applied to the curved LCD device, and the third column spacer 276 may contact the fourth color pattern 246b of the second light-blocking layer 246. At this time, since the third column spacer 246 includes the depressed portions 276a, the third column spacer 276 is in point-contact with the fourth color pattern 246b of the second light-blocking layer 246 due to the depressed portions 276a. Accordingly, the stress applied to the first and second substrates 210 and 270 is dispersed as compared with the surface contact, and the stress applied to the liquid crystal molecules of the liquid crystal layer 280 is decreased, whereby the liquid crystal molecules are twisted with a relatively small angle with respect to each other. In addition, when a surface of the curved LCD device is touched, the third column spacer 276 also may be in point-contact with the fourth color pattern 246b of the second light-blocking layer 246 due to the depressed portions 276a. At this time, the stress applied to the liquid crystal molecules also may be decreased.

As a result, when the stress is applied into the non-display area NAA, the stress sensitivity, which may be indicated as a change in light transmittance depending on twist of the liquid crystal molecules when stress is applied, is improved, and the light leakage is reduced.

In the curved LCD device 200, the touch visibility is improved by controlling the arrangement density of the first and second column spacers 272 and 274, which is the number of column spacers with respect to the number of pixel regions, in the display area AA.

Figure 7:
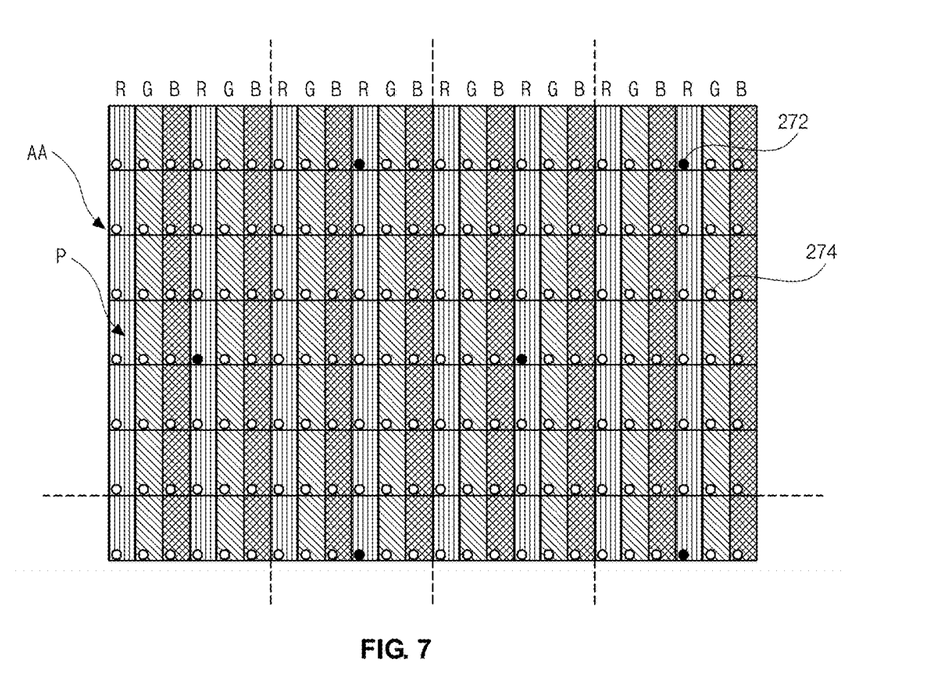
FIG. 7 is a schematic plan view showing an arrangement of first and second column spacers in a display area of a curved LCD device according to the second embodiment of the present invention.

The arrangement of the first and second column spacers 272 and 274 will be described with reference to FIG. 7. FIG. 7 is a schematic plan view showing an exemplary arrangement of first and second column spacers in a display area of a curved LCD device according to the second embodiment of the present invention.

In FIG. 7, a plurality of pixel regions P are arranged in a matrix form along a first direction (transverse direction) and a second direction (longitudinal direction) in a display area AA. The pixel regions P arranged in the second direction include the same color filter, i.e., one of red, green, and blue color filters R, G, and B, and the pixel region P arranged in the first direction include red, green, and blue pixel regions P, which include the red, green, and blue color filters R, G, and B and are sequentially repeatedly arranged.

One of first and second column spacers 272 and 274 is in each pixel region P, and the number of the second column spacers 274 is greater than the number of the first column spacers 272.

For example, on the basis of 36 pixel regions P, one first column spacer 272 is formed in one of 36 pixel regions P, and 35 column spacers 274 are formed in the remainder of 36 pixel regions P, respectively.

As stated above, in the curved LCD device 200 of FIG. 6, the arrangement density of the first column spacers 272, as the gap column spacer, is lowered, and the arrangement density of the second column spacers 274, as the push column spacer, is increased. Thus, the touch margin, which is a degree of touch without causing light leakage or other problems, is increased, and the touch visibility is improved.

Figure 8:
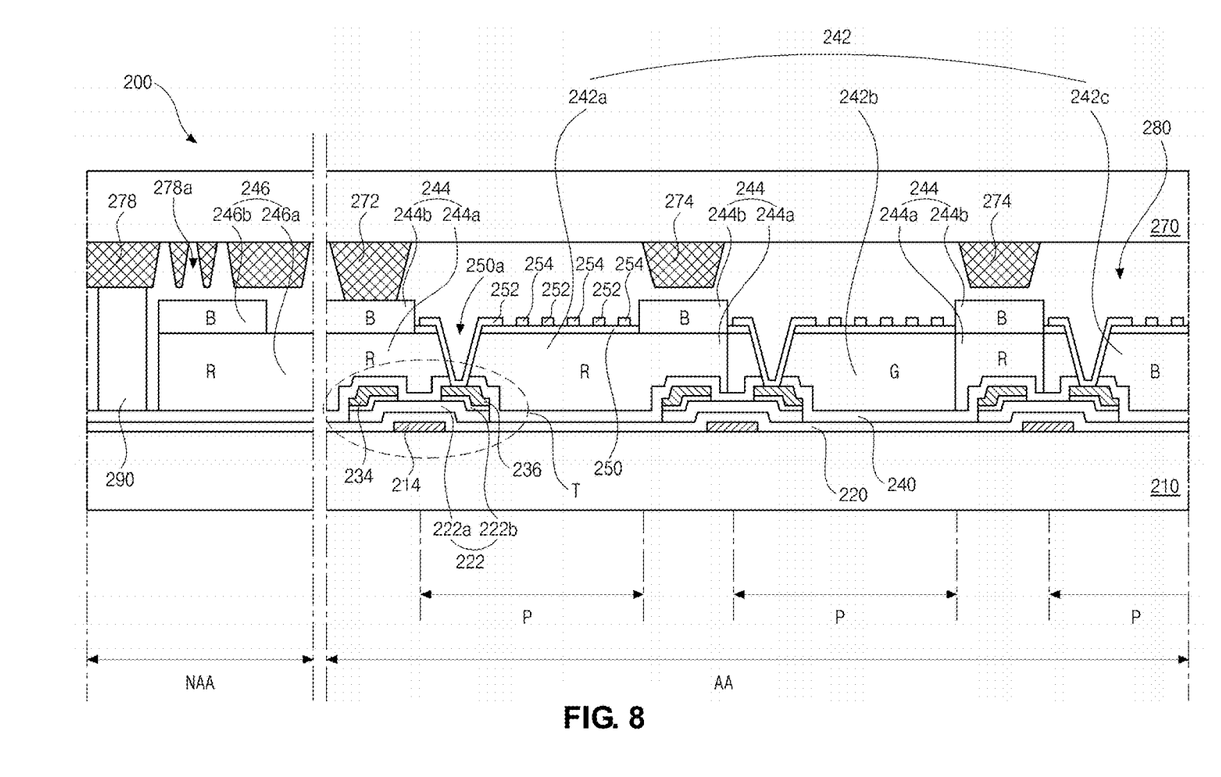
FIG. 8 is a cross-sectional view illustrating a curved LCD device according to a third exemplary embodiment of the present invention.

FIG. 8 is a cross-sectional view illustrating a curved LCD device according to a third embodiment of the present invention. The curved LCD device according to the third embodiment has substantially the same structure as the curved LCD device according to the second embodiment except for a third column spacer. The same reference numbers will be used to refer to the same parts as the second embodiment, and explanations for the same parts will be omitted.

In FIG. 8, a third column spacer 278 is formed in the non-display area NAA on the inner surface of the second substrate 270. The third column spacer 278 is formed of black resin absorbing light to block light leakage in the non-display area NAA. The third column spacer 278 includes a plurality of depressed portions 278a at its top surface. The depressed portions 278a correspond to the fourth color pattern 246b of the second light-blocking layer 246. That is, the third column spacer 278 has a flat surface without depressed portions corresponding to the third color pattern 246a exposed outside the fourth color pattern 246b.

The depressed portions 278a may have a shape such as a polygon including a rectangle or a circle in a plan view. A depth of the depressed portions 278a is the same as the height of the third column spacer 278, and thus, the inner surface of the second substrate 270 is exposed through the depressed portions 278a.

Here, the maximum width of the depressed portions 278a and a distance between adjacent depressed portions 278a may be more than 25 micrometers.

In the curved LCD device 200 according to the third embodiment of the present invention, since the third column spacer 278 includes the depressed portions 278a corresponding to the fourth color pattern 246b of the second light-blocking layer 246, when the curvature is formed in the curved LCD device according to the third embodiment of the present invention, the third column spacer 278 is in point-contact with the fourth color pattern 246b of the second light-blocking layer 246. Similar to the second embodiment described above, the stress applied to the first and second substrates 210 and 270 is dispersed, and the stress applied to the liquid crystal molecules of the liquid crystal layer 280 is decreased, as the liquid crystal molecules are twisted with a relatively small angle with respect to each other.

As a result, when the stress of curvature is applied into the non-display area NAA, the stress sensitivity, which may be indicated as a change in light transmittance depending on twist of the liquid crystal molecules when stress is applied, is improved, and the light leakage is reduced.

Figure 9:
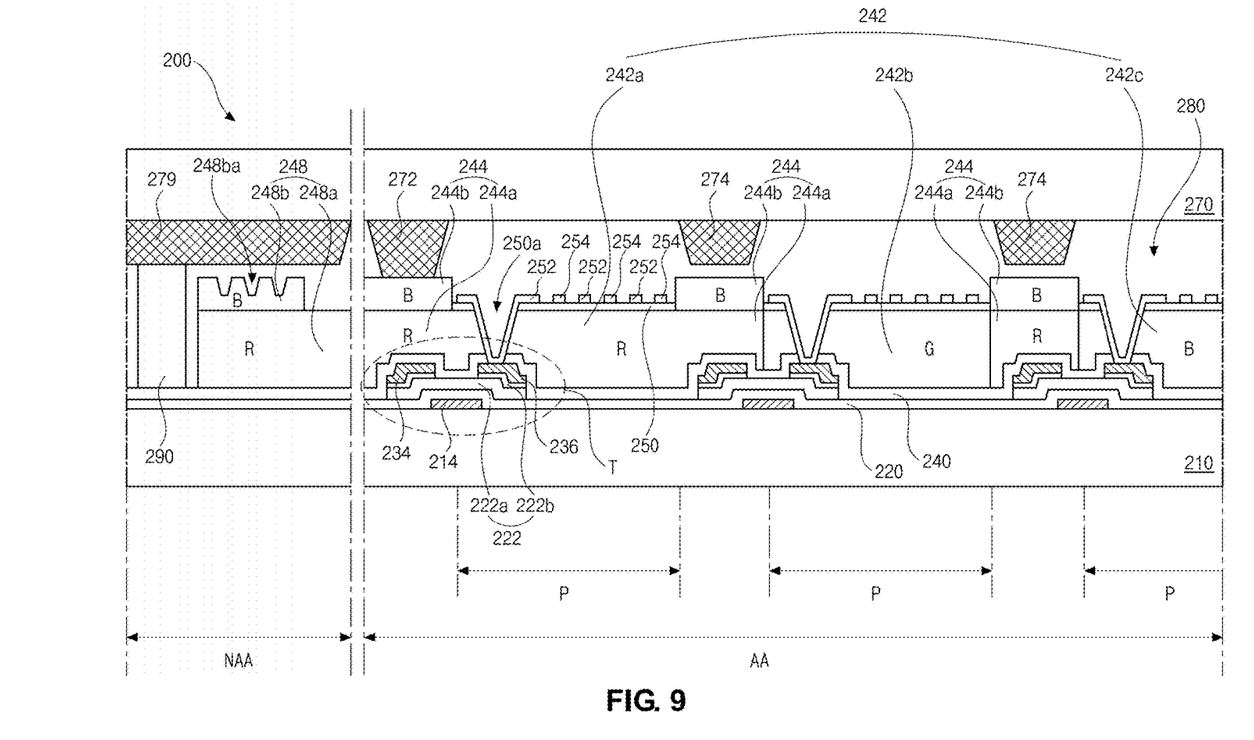
FIG. 9 is a cross-sectional view illustrating a curved LCD device according to a fourth exemplary embodiment of the present invention.

FIG. 9 is a cross-sectional view illustrating a curved LCD device according to a fourth embodiment of the present invention. The curved LCD device according to the fourth embodiment has substantially the same structure as the curved LCD device according to the second embodiment except for a third column spacer and a second light-blocking layer. The same reference numbers will be used to refer to the same parts as the second embodiment, and explanations for the same parts will be omitted.

In FIG. 9, a second light-blocking layer 248 is formed in the non-display area NAA on the inner surface of the first substrate 210. Here, the non-display area NAA surrounds the display area AA. The second light-blocking layer 248 may surround the display area AA.

The second light-blocking layer 248 includes a third color pattern 248a and a fourth color pattern 248b on the third color pattern 248a. The third color pattern 248a may be formed of the same material as the red color filter 242a, and the fourth color pattern 248b may be formed of the same material as the blue color filter 242c. The fourth color pattern 248b may have a smaller size than the third color pattern 248a due to steps of the layers thereunder, and the fourth color pattern 248b may partially expose the third color pattern 248a. Alternatively, the fourth color pattern 248b may have the same size as the third color pattern 248a.

The fourth color pattern 248b includes a plurality of depressed portions 248ba at its top surface. The depressed portions 248ba may have a shape such as a polygon including a rectangle or a circle in a plan view. A depth of the depressed portions 248ba is smaller than the height of the fourth color pattern 248b. Here, the maximum width of the depressed portions 248ba and a distance between adjacent depressed portions 248ba may be less than 25 micrometers.

The gate insulating layer 220 and the passivation layer 240 may be formed under the second light-blocking layer 248.

A third column spacer 279 may be formed in the non-display area NAA on the inner surface of the second substrate 270. The third column spacer 279 is formed of black resin absorbing light to block light leakage in the non-display area NAA. The third column spacer 279 has a flat surface without depressed portions.

In the curved LCD device 200 according to the fourth embodiment of the present invention, the fourth color pattern 248b of the second light-blocking layer 248 includes the depressed portions 248ba, and the third column spacer 279 has the flat surface. Therefore, when the curvature is formed in the curved LCD device according to the fourth embodiment, the third column spacer 279 is in point-contact with the fourth color pattern 248b of the second light-blocking layer 248. Accordingly, the stress applied to the first and second substrates 210 and 270 is dispersed, and the stress applied to the liquid crystal molecules of the liquid crystal layer 280 is decreased, as the liquid crystal molecules are twisted with a relatively small angle with respect to each other.

As a result, when the stress due to curvature is applied into the non-display area NAA, the stress sensitivity, which may be indicated as a change in light transmittance depending on twist of the liquid crystal molecules when stress is applied, is improved, and the light leakage is reduced.

In the fourth embodiment, although the depth of the depressed portions 248ba of the fourth color pattern 248b is smaller than the height of the fourth color pattern 248b, the depth of the depressed portions 248ba of the fourth color pattern 248b may be the same as the height of the fourth color pattern 248b, and the top surface of the third color pattern 248a may be exposed through the depressed portions 248ba similar to the third embodiment.

In the embodiments of the present invention, the depressed portions are formed in the third column spacer or the second light-blocking layer. Alternatively, embossing structures may be formed in addition to the depressed portions. However, the structure is not limited on this, and any structure for causing a point-contact between the third column spacer and the second light-blocking layer can be used.

In the curved LCD device of the present invention, the distance from the main viewing point of the viewer to the center of the curved LCD device is the same as the distance from the main viewing point to the left or right side of the curved LCD device, and the distance deviation is prevented. Accordingly, the sense of immersion into the displayed imagery by the viewer is improved.

In addition, because the curved LCD device of the present invention has the color filter on array structure (COT), the black matrix can be omitted, and the aperture ratio can be further increased.

Moreover, because the first light-blocking layer of the same material as the color filter is formed in the display area, the first light-blocking layer separates the pixel regions and blocks light leakage outside the pixel region.

Furthermore, the second light-blocking layer of the same material as the color filter is formed in the non-display area, and the outer column spacer of the black resin is also formed in the non-display area, thereby blocking the light leakage in the non-display area. One of the second light-blocking layer and the outer column spacer includes the depressed portions, and the second light-blocking layer is in point-contact with the outer column spacer when the curvature is formed in the curved LCD device. Accordingly, the sensitivity is improved and the aperture ratio is improved in the non-display area.

Also, the arrangement density of the gap column spacers is lowered, and the arrangement density of the push column spacers is increased in the display area. Thus, the touch margin is increased, and the touch visibility is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A curved liquid crystal display device, comprising:
   a first substrate and a second substrate where a display area and a non-display area are defined;
   a liquid crystal between the first and the second substrates;
   a gate line and a data line in the display area on an inner surface of the first substrate and crossing each other to define a pixel region;
   a thin film transistor connected to the gate line and the data line;
   a color filter layer in the pixel region of the first substrate and including red, green, and blue color filters;
   a pixel electrode on the color filter layer and connected to the thin film transistor;
   a common electrode on the color filter layer, spaced apart from and alternating with the pixel electrode;
   a plurality of first light-blocking layers in the display area over an inner surface of the first substrate, each first light-blocking layer being between adjacent pixel regions;
   a second light-blocking layer in the non-display area over the inner surface of the first substrate;
   a first column spacer and a second column spacer in the display area on an inner surface of the second substrate, wherein the first column spacer corresponds to one of the first light-blocking layers and has a first height, and the second column spacer corresponds to another of the first light-blocking layers and has a second height; and
   a third column spacer in the non-display area on the inner surface of the second substrate and having the second height, wherein one of the third column spacer and the second light-blocking layer comprises a flat surface and a plurality of depressed portions and a depth of the depressed portions is smaller than a height of the one of the third column spacer and the second light-blocking layer,
   wherein the first light-blocking layer includes a first color pattern and a second color pattern, and the second light-blocking layer includes a third color pattern and a fourth color pattern,
   wherein the third column spacer is spaced apart from the second light-blocking layer when an external force is not applied, and is in contact with the second light-blocking layer when an external force is applied,
   wherein the first height is greater than the second height,
   wherein an arrangement density of the first column spacer is lower than an arrangement density of the second column spacer, and
   wherein a seal pattern is disposed between the first and second substrates, and a surface of the third column spacer facing the second light-blocking layer is in contact with the seal pattern.

2. The curved liquid crystal display device according to claim 1, wherein the first color pattern and the third color pattern include a same material as the red color filter, and the second color pattern and the fourth color pattern include a same material as the blue color filter.

3. The curved liquid crystal display device according to claim 1, wherein the third column spacer includes the plurality of depressed portions.

4. The curved liquid crystal display device according to claim 3, wherein the fourth color pattern has a smaller area than the third color pattern to partially expose the third color pattern, and the depressed portions correspond to the fourth color pattern.

5. The curved liquid crystal display device according to claim 1, wherein the fourth color pattern includes the plurality of depressed portions.

6. The curved liquid crystal display device according to claim 5, wherein the fourth color pattern has a smaller area than the third color pattern to partially expose the third color pattern.

7. The curved liquid crystal display device according to claim 5, wherein the depth of the depressed portions is smaller than a height of the fourth color pattern.

8. The curved liquid crystal display device according to claim 5, wherein the depth of the depressed portions is a same as a height of the fourth color pattern, and the third color pattern is exposed through the depressed portions.

9. The curved liquid crystal display device according to claim 1, wherein the first column spacer is in one of 36 pixel regions, and the second column spacer is in the remainder of the 36 pixel regions.

10. A display device, comprising:
    a first substrate and a second substrate having a display area and a non-display area;
    a first line and a second line are formed on the first substrate and crossing each other to define a pixel region;
    a color filter layer in the pixel region of the first substrate and including red, green, and blue color filters;
    a first light-blocking layer formed on the display area of the first substrate;
    a second light-blocking layer formed on the non-display area of the first substrate;
    a first column spacer formed on the display area of the second substrate and has a first height;
    a second column spacer formed on the display area of the second substrate and has a second height; and
    a third column spacer formed on the non-display area of the second substrate and has a third height, wherein one of the third column spacer and the second light-blocking layer comprises a flat surface and a plurality of depressed portions and a depth of the depressed portions is smaller than a height of the one of the third column spacer and the second light-blocking layer,
    wherein the first column spacer and the third column spacer are corresponding to the first light-blocking layer and the second light-blocking layer respectively,
    wherein the second light-blocking layer includes same materials as the red and blue color filters,
    wherein the first height of the first column spacer is greater than the third height of the third column spacer, and the first height of the first column spacer is greater than the second height of the second column spacer,
    wherein an arrangement density of the first column spacer is lower than an arrangement density of the second column spacer, and
    wherein a seal pattern is disposed between the first and second substrates, and a surface of the third column spacer facing the second light-blocking layer is in contact with the seal pattern.

11. The display device according to claim 10, wherein the third column spacer is spaced apart from the second light-blocking layer when an external force is not applied, and is in contact with the second light-blocking layer when an external force is applied.

12. The display device according to claim 10, wherein the third column spacer includes the plurality of depressed portions and the third height of the third column spacer is substantially same as the second height of the second column spacer.

13. An apparatus comprising:
- a pair of substrates facing each other and having a display area and a non-display area;
- a first light-blocking structure between adjacent pixel regions in the display area on at least one of the substrates, and a second light-blocking structure in the non-display area;
- an array of first column spacers on one of the substrates, each of the first column spacers having a first height and configured to be in contact with a surface of the first light-blocking structure to provide a gap distance between the substrates;
- an array of second column spacers on the one of the substrates, each of the second column spacers having a second height that is less than that of the first column spacers to substantially maintain the gap distance across portions of the substrates, the specific height being appropriate for accommodating possible physical stress or tension acting on at least one of the substrates; and
- an array of third column spacers on at least one of the substrates at the non-display area thereof, each of the third column spacers having a third height, wherein one of the third column spacers and the second light-blocking structure comprises a flat surface and a plurality of depressed portions and a depth of the depressed portions is smaller than a height of the one of the third column spacers and the second light-blocking layer, wherein the second light-blocking structure in the non-display area includes at least two color filter layers, wherein the first height of the first column spacer is greater than the second height of the second column spacer, and the first height of the first column spacer is greater than the third height of the third column spacer, wherein an arrangement density of the first column spacer is lower than an arrangement density of the second column spacer, and wherein a seal pattern is disposed between the first and second substrates, and a surface of the third column spacer facing the second light-blocking layer is in contact with the seal pattern.

14. The apparatus of claim 13, wherein the array of third column spacers is configured with light absorbing black resin material in consideration of potential light leakage phenomena at edge or corner portions of the substrates.

15. The apparatus of claim 14, wherein the substrates, first and second light-blocking layers, and the first through third column spacers are implemented in a liquid crystal display (LCD) device, and the physical stress or tension is caused by at least one among a curvature of the LCD device and physical touch contact applied by a user onto a surface of at least one of the substrates.

* * * * *